(12) United States Patent
Chen (10) Patent No.: US 8,872,988 B2
(45) Date of Patent: Oct. 28, 2014

(54) IMAGE DISPLAY APPARATUS AND METHODS FOR DISPLAYING IMAGES

(75) Inventor: Cheng-Yi Chen, Chu-Nan (TW)

(73) Assignee: Innolux Corporation, Chu-Nan (TW)

( * ) Notice: Subject to any disclaimer, the term of this patent is extended or adjusted under 35 U.S.C. 154(b) by 324 days.

(21) Appl. No.: 13/470,223

(22) Filed: May 11, 2012

(65) Prior Publication Data

US 2012/0293468 A1 Nov. 22, 2012

(30) Foreign Application Priority Data

May 16, 2011 (TW) ............................. 100117017 A (51) Int. Cl.
| | | |
|---|---|---|
| *G02F 1/1335* | (2006.01) | |
| *G02F 1/1333* | (2006.01) | |
| *G02B 27/22* | (2006.01) | |
| *G03B 35/18* | (2006.01) | |
| *G09G 3/00* | (2006.01) | |
| *G02B 27/26* | (2006.01) | |
| *G02B 1/08* | (2006.01) | |
| *G02F 1/29* | (2006.01) | |
| *G09G 3/20* | (2006.01) | |

(52) U.S. Cl.
CPC .............. *G02B 1/08* (2013.01); *G02B 27/2214* (2013.01); *G09G 3/20* (2013.01); *G03B 35/18* (2013.01); *G09G 3/003* (2013.01); *G02B 27/26* (2013.01); *G02F 1/133526* (2013.01); *G02F 1/29* (2013.01)
USPC .................... 349/15; 349/95; 349/96; 349/87

(58) Field of Classification Search
CPC ............ G02F 1/1335; G02F 1/133526; G02F 1/133528; G02F 1/133621; G02F 1/133536; G02B 6/003; G02B 27/26; G02B 27/2214; H04N 13/0404; H04N 13/0434; H04N 13/0409
USPC ........................................... 349/15, 95, 96, 87
See application file for complete search history.

(56) References Cited

U.S. PATENT DOCUMENTS

| 5,831,765 | A   | * | 11/1998 | Nakayama et al. ............ 359/464 |
| 7,697,204 | B2  | * | 4/2010  | Sugiyama ..................... 359/465 |
| 2006/0262365 | A1 |   | 11/2006 | Imao |

FOREIGN PATENT DOCUMENTS

| CN | 101126840 | 2/2008 |
| CN | 201126495 | 10/2008 |
| CN | 101968587 | 2/2011 |
| TW | 201015204 | 4/2010 |

* cited by examiner

*Primary Examiner* — Mike Qi
(74) *Attorney, Agent, or Firm* — Liu & Liu (57) ABSTRACT

A disclosed apparatus includes a display device having a polarizer, a liquid crystal panel having a first liquid crystal region and a second liquid crystal region of different liquid crystal orientations, and a lenticular lens having a cavity to contain a third liquid crystal region and a fourth liquid crystal region of different liquid crystal orientations, wherein the liquid crystal panel is disposed between the lenticular lens and the display device, and the first liquid crystal region corresponds to the third liquid crystal region, and the second liquid crystal region corresponds to the fourth liquid crystal region.

10 Claims, 6 Drawing Sheets

IMAGE DISPLAY APPARATUS AND METHODS FOR DISPLAYING IMAGES

CROSS REFERENCE TO RELATED APPLICATIONS

This application claims priority of Taiwan Patent Application No. 100117017, filed on May 16, 2011, the entirety of which is incorporated by reference herein.

BACKGROUND OF THE INVENTION

1. Field of the Invention

The present disclosure relates to image display apparatuses, and in particular relates to displaying 2D or 3D images utilizing the same.

2. Description of the Related Art

A general 3D image display technology is completed through eyes of a viewer on the basis of stereoscopic vision principles. The human eyes have a distance of 5 cm to 7 cm therebetween, such that the right eye and the left eye will see images with little differences. The phenomenon of the different right eye and left eye images is the so-called binocular parallax. The conventional 3D image display apparatus is designed based on the binocular parallax, thereby only displaying right eye images for a right eye of a viewer, and left eye images for a left eye of the viewer.

Most of the 3D image display methods based on the binocular parallax need a viewer to wear specific devices such as a polarized glass, a red/blue (or green) glass, a shutter glass, or a helmet mounted display. However, the specific devices are inconvenient for viewers. Therefore, naked-eye type 3D image display apparatuses have recently been developed, such that the viewer may see 3D images without wearing any specific device.

When the naked-eye type 3D image display apparatus is designed on the basis of the binocular parallax principle, it is named a parallax and naked-eye type 3D image display device. In this design, a light-shielding element such as a parallax barrier or a grating is located before an array of light sources of a display device (e.g. LCD), wherein the array of the light source alternately transfers left eye images and right eye images. The right eye of the viewer only sees the right eye images, and the left eye of the viewer only sees the left eye images, respectively, through the parallax barrier. As such, the right eye images received by the right eye and the left eye images received by the left eye will be automatically combined by the viewer's brain to form stereoscopic images. However, the naked-eye type 3D image display apparatuses have poorer resolution than the 3D image display apparatuses accompanied with the specific devices (e.g. polarized glass).

Most of the stereoscopic TVs may display 2D images and 3D images, respectively. The glass type 3D image display method has high image resolution, but the naked-eye type 3D image display method will mainly be applied therewith due to its convenience. So far, for present technology, all naked-eye type 3D image display methods have problems such as a low resolution and narrow viewing angles. In other words, the present naked-eye type 3D image display method is insufficient for TV applications. If the advantages of the glass type 3D image display method and the naked-eye type 3D image display method can be combined, a viewer will experience an individual stereoscopic visual experience. For example, the viewer may wear glasses to watch 3D images of high resolution. Alternatively, the viewer may see 2D TV programs without wearing specific glasses. Naked-eye type 3D programs (such as an advertisement) can be inserted between the 2D TV programs, and the TV will switch to a naked-eye 3D type to display the 3D programs, such that the sudden 3D programs may leave a deep impression on viewers.

Accordingly, a novel display device to solve the described problems is called-for.

BRIEF SUMMARY OF THE INVENTION

One embodiment of the disclosure provides an image display apparatus, comprising: a display device including a polarizer; a liquid crystal panel including: a first liquid region of a first liquid crystal orientation and a second liquid crystal region of a second liquid crystal orientation, wherein the first liquid crystal orientation is different from the second crystal orientation; and a lenticular lens including a cavity to contain a third liquid crystal region of a third liquid crystal orientation and a fourth liquid crystal region of a fourth liquid crystal orientation, wherein the third liquid crystal orientation is different from the fourth crystal orientation, and the liquid crystal panel is disposed between the lenticular lens and the display device. The first liquid crystal region corresponds to the third liquid crystal region, and the second liquid crystal region corresponds to the fourth liquid crystal region.

One embodiment of the disclosure provides a method for displaying images, comprising: providing the described image display apparatus to display images, wherein the images travelling through the polarizer have a first polarization direction; and driving the liquid crystal panel to modulate the first liquid crystal orientation of the first liquid crystal region and the second liquid crystal orientation of the second liquid crystal region, wherein the images travelling through the first liquid crystal region have a second polarization direction, the images travelling through the second liquid crystal region have the first polarization direction, and the first polarization direction is different from the second polarization direction, wherein the third liquid crystal orientation of the third liquid crystal region is vertical to the second polarization direction, and the fourth liquid crystal orientation of the fourth liquid crystal region is vertical to the first polarization direction. The images travelling through the third and fourth liquid crystal regions and the lenticular lens enter right and left eyes of a viewer, wherein the viewer sees the images of a two-dimensional mode.

One embodiment of the disclosure provides a method for displaying images, comprising: providing a polarized glass to a viewer, wherein the polarized glass includes a first glass for images of a first polarization direction travelling therethrough and a second glass for images of a second polarization direction travelling therethrough; providing the described image display apparatus to display images, wherein the images travelling through the polarizer have the first polarization direction; and driving the liquid crystal panel to modulate the first liquid crystal orientation of the first liquid crystal region and the second liquid crystal orientation of the second liquid crystal region, wherein the images travelling through the first liquid crystal region have the second polarization direction, the images travelling through the second liquid crystal region have the first polarization direction, and the first polarization direction is different from the second polarization direction. The third liquid crystal orientation of the third liquid crystal region is vertical to the second polarization direction, and the fourth liquid crystal orientation of the fourth liquid crystal region is vertical to the first polarization direction. The images travelling through the third liquid crystal region have the second polarization direction to further travel through the lenticular lens and the second glass, and the images travelling through the fourth liquid crystal region have the first polarization direction to further travel through the lenticular lens and the first glass. The viewer sees the images of a three-dimensional mode.

One embodiment of the disclosure provides a method for displaying images, comprising: providing the described image display apparatus to display images, wherein the images travelling through the polarizer have a first polarization direction; and driving the liquid crystal panel to modulate the first liquid crystal orientation of the first liquid crystal region and the second liquid crystal orientation of the second liquid crystal region, wherein the images travelling through the first liquid crystal region have a first polarization direction, the images travelling through the second liquid crystal region have the second polarization direction, and the first polarization direction is different from the second polarization direction. The third liquid crystal orientation of the third liquid crystal region is parallel to the second polarization direction, and the fourth liquid crystal orientation of the fourth liquid crystal region is parallel to the first polarization direction. The images travelling through an interface between the third and fourth liquid crystal regions and the lenticular lens are deflected to right and left eyes of a viewer. The viewer sees the images of a three-dimensional mode A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
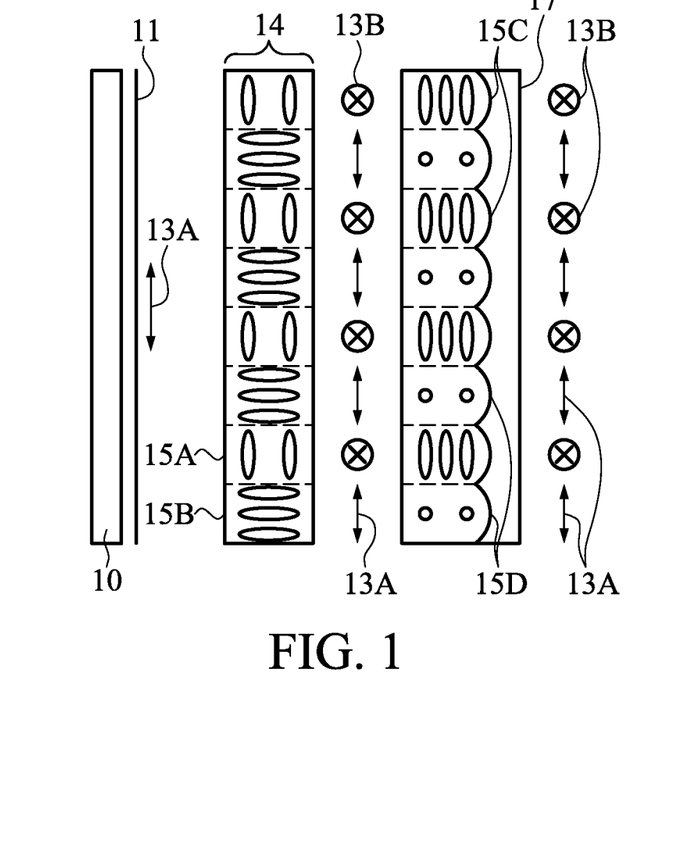
FIG. 1 shows a naked-eye type 2D image display mode of one embodiment in the disclosure.

The glass type 3D image display apparatuses are inconvenient due to wearing and taking off polarized glasses while switching between 2D and 3D display modes. On the other hand, the naked-type 3D image display apparatuses only provide 3D images of a low resolution. The disclosure provides a novel display apparatus to solve the described problems. As shown in FIG. 1, the display apparatus includes a display device 10 containing a polarizer 11, a liquid crystal panel 14 having liquid crystal regions 15A and 15B, and a lenticular lens 17 having cavities filled of liquid crystal regions 15C and 15D. The display device 10 can be an electronic paper, an electronic reader, an electroluminescent display (ELD), an organic electroluminescent display (OELD), a vacuum fluorescent display (VFD), a light emitting diode display (LED), a cathode ray tube (CRT), a liquid crystal display (LCD), a plasma display panel (PDP), a digital light processing (DLP) display, a liquid crystal on silicon (LCoS), an organic light-emitting diode (OLED), a surface-conduction electron-emitter display (SED), a field emission display (FED), a laser TV (Quantum dot laser; Liquid crystal laser), a ferro liquid display (FLD), an interferometric modulator display (iMoD), a thick-film dielectric electroluminescent (TDEL), a quantum dot display (QD-LED), a telescopic pixel display (TPD), an organic light-emitting transistor (OLET), an electrochromic display, a laser phosphor display (LPD), or the likes. In one embodiment, the display device 10 is a liquid crystal display.

Figure 4:
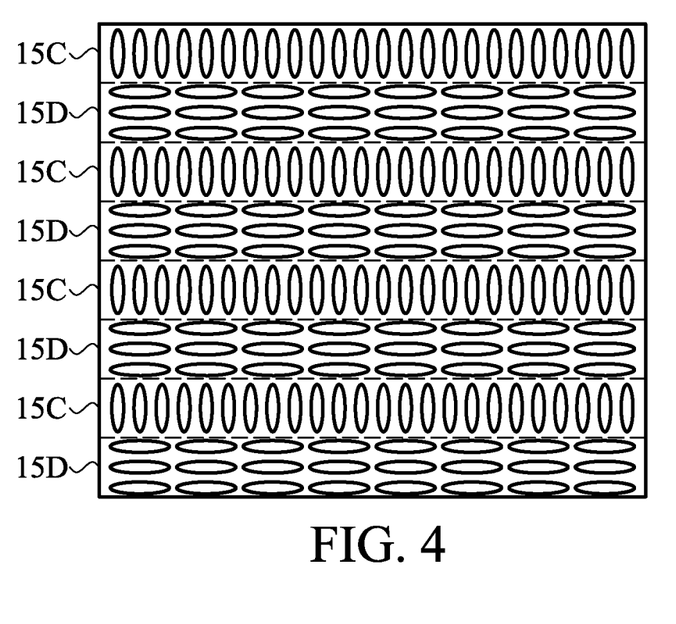
FIG. 4 shows a top-view of liquid crystal orientations of different liquid crystal regions in a liquid crystal panel of embodiments in the disclosure.

The liquid crystal panel 14 is disposed between the display device 10 and the lenticular lens 17. The liquid crystal orientations of the liquid crystal regions 15A and 15B can be driven by a driving circuit (not shown) of the liquid crystal panel 14. In one embodiment, an alignment layer of different alignment directions is formed by lithography on the cavity surfaces of the lenticular lens 17. A polymerizable liquid crystal composition is then filled into the cavities of the lenticular lens 17, and liquid crystal molecules thereof are arranged according to the alignment directions of the alignment layer. Thereafter, the polymerizable liquid crystal composition is solidified by a thermal curing process or a photo curing process, thereby forming the liquid crystal regions 15C and 15D. As shown in a top-view of FIG. 4, the liquid crystal regions 15C and 15D have different liquid crystal orientations. In another embodiment, an active control circuit (e.g. TFT array) or a passive control circuit is formed on the surface of the cavities of the lenticular lens 17. An alignment layer of different alignment directions is then formed by lithography on the cavity surfaces of the lenticular lens 17. A liquid crystal composition is then filled into the cavities of the lenticular lens 17. The liquid crystal composition can be controlled by the control circuit, thereby forming the liquid crystal regions 15C and 15D having different liquid crystal orientations. The liquid crystal molecules in the liquid crystal regions 15C and 15D have birefringence such as an ordinary refractive index ($n_o$) and an extraordinary refractive index ($n_e$). A refractive index of the lenticular lens 17 is similar to the ordinary refractive index ($n_o$) of the liquid crystal molecules in the liquid crystal regions 15C and 15D. In one embodiment, the liquid crystal molecules in the liquid crystal regions 15C and 15D have an extraordinary refractive index ($n_e$) of 1.0 to 2.5 and an ordinary refractive index ($n_o$) of 1.0 to 2.5, wherein the $n_o$ and $n_e$ have a difference of 0.01 to 2.0. An extremely large difference between the $n_e$ and $n_o$ may cause the lens focus of the lenticular lens 17 to be too short, such that images cannot be focused onto a surface of the display device 10 when a thickness of the liquid crystal regions 15A and 15C (or 15B and 15D) is limited to a reasonable range. As a result, the images will be defocused. An extremely small difference between the $n_e$ and $n_o$ may cause the lens focus of the lenticular lens 17 to be too long, such that the distance between the lenticular lens 17 and the display device 10 may be overly extended to focus the 3D images.

If a polarization direction of a polarized light is vertical to the liquid crystal orientation of the liquid crystal region 15C (or 15D), the polarized light will not be influenced by the liquid crystal region 15C (or 15D) while travelling therethrough. Meanwhile, the polarized light will not be deflected in an interface between the liquid crystal region 15C (or 15D) and the lenticular lens 17. In other words, the polarized light travelling into the liquid crystal region 15C (or 15D) will hold its path and straightly travel out of the lenticular lens 17. On the other hand, if a polarization direction of a polarized light is not totally vertical to or even parallel to the liquid crystal orientation of the liquid crystal region 15C (or 15D), the polarized light will be influenced by the liquid crystal region 15C (or 15D) while travelling therethrough. Meanwhile, the polarized light will be deflected in the interface between the liquid crystal region 15C (or 15D) and the lenticular lens 17. In other words, the polarized light travelling into the liquid crystal region 15C (or 15D) will change its path and then inclinely travel out of the lenticular lens 17.

The liquid crystal regions 15A correspond to the liquid crystal regions 15C, and the liquid crystal regions 15B correspond to the liquid crystal regions 15D, respectively. The wording "corresponding" is defined as follows. A polarized light travelling into a part of one liquid crystal region 15A will only travel through its corresponding liquid crystal region 15C, rather than travel through other liquid crystal regions 15D or 15C. Similarly, a polarized light travelling into a part of one liquid crystal region 15B will only travel through its corresponding liquid crystal region 15D, rather than travel through other liquid crystal regions 15C or 15D. As described above, the liquid crystal regions 15A and 15B have different liquid crystal orientations. In addition, the liquid crystal regions 15C and 15D have different liquid crystal orientations. The liquid crystal orientations of the liquid crystal regions 15A and 15B of the liquid crystal panel 14 can be changed by the driving circuit of the liquid crystal panel 14. In one embodiment, the liquid crystal orientations of the liquid crystal regions 15C and 15D are solidified before the lenticular lens 10 assembled to the display device 10. In another embodiment, the liquid crystal orientations of the liquid crystal regions 15C and 15D can be controlled by the control circuit on the cavity surfaces of the lenticular lens 17. The driving circuit and the control circuit can be a column-shaped passive circuit or a grid-shaped active circuit depending on need.

In one embodiment, an image display apparatus as shown in FIG. 1 is applied to display 2D images. After travelling through the display device 10 and the polarizer 11, a light emitted from a backlight unit will have a polarization direction 13A. It should be explained that the polarization direction 13A (e.g. 90° and 270°) and arrow direction in corresponding figures and descriptions are used for illustration, and not to limit the actual polarization direction of the light and images. For example, the polarization direction 13A can be other directions such as 0° and 180°, 45° and 225°, 135° and 315°, or other common polarization directions depending on the polarizer 11 type.

Figure 2A:
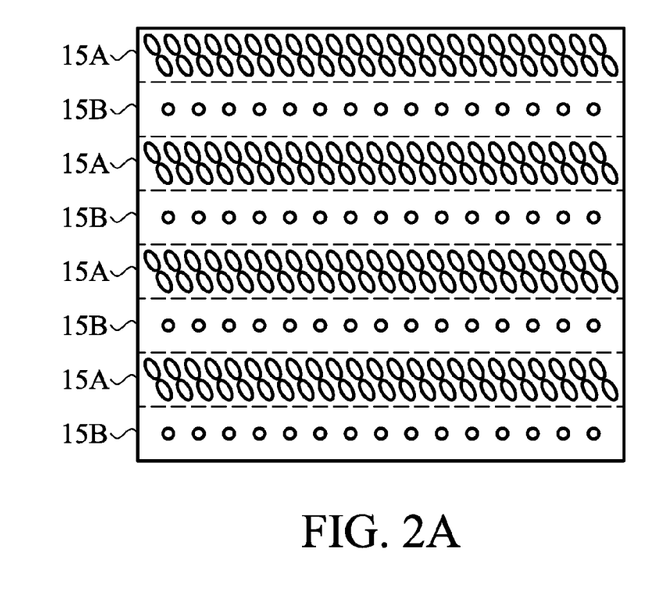
FIGS. 2A-2D show top-views of liquid crystal orientations of different liquid crystal regions in liquid crystal panels of embodiments in the disclosure.
Figure 2B:
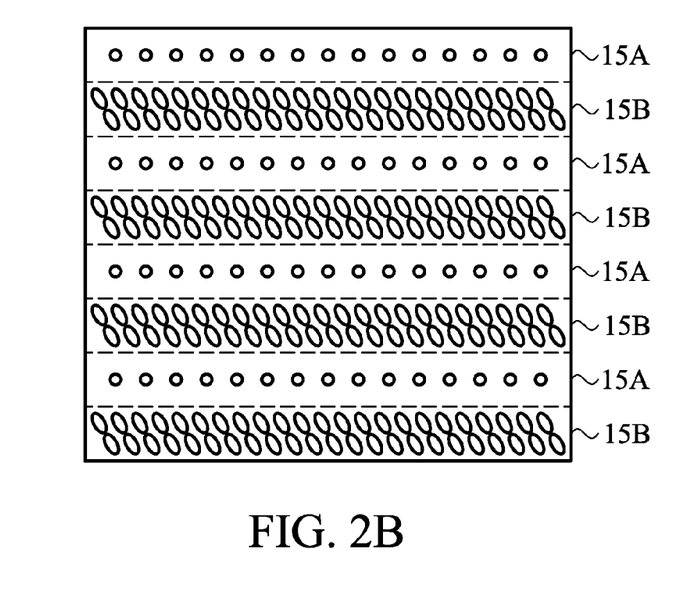
Figure 2C:
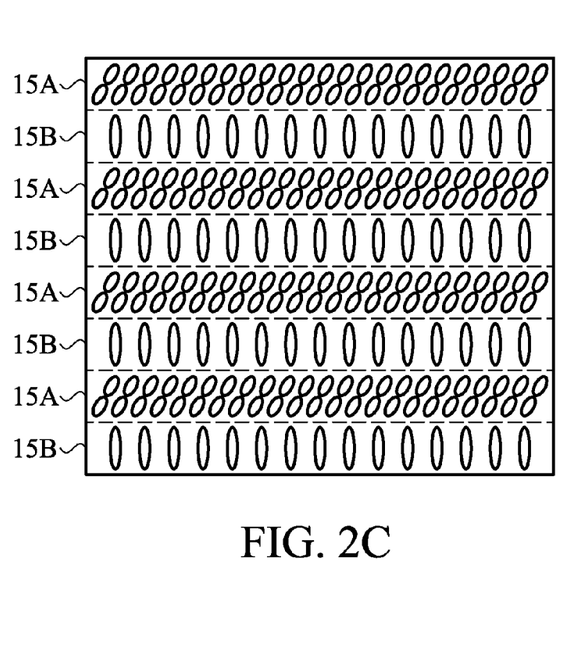

After travelling through the liquid crystal regions 15A and 15B of the liquid crystal panel 14, the polarization direction 13A of the images will be changed by the liquid crystal orientations of the liquid crystal regions 15A and 15B. As shown in FIG. 1, the polarization direction of the images travelling through the liquid crystal region 15A will be changed from 13A to 13B (0° and 180°), and the polarization direction of the images travelling through the liquid crystal region 15B will be held as 13A. For the described effect, the liquid crystal orientation of the liquid crystal region 15A should rotate to be 45° and 225°, and the liquid crystal orientation of the liquid crystal region 15B should be rotated to be parallel to an incident direction of the images, as shown in a top-view of the liquid crystal panel 14 in FIG. 2A. The liquid crystal orientations of the liquid crystal regions 15A and 15B are controlled by the driving circuit (not shown) of the liquid crystal panel 14. It should be understood that the liquid crystal orientation of the liquid crystal region 15A can be 135° and 315°, and the liquid crystal orientation of the liquid crystal panel 15B can be vertical to the incident direction of the images and parallel (or vertical) to the polarization direction 13A of the images, as shown in top-views of the liquid crystal panel 14 in FIGS. 2B and 2C. Note that the liquid crystal orientations of the liquid crystal regions 15A and 15B, depending on the polarization direction of the images and the liquid crystal orientations of the liquid crystal regions 15C and 15D, are not limited to the illustrated liquid crystal orientations in the figures.

Because the liquid crystal orientation of the liquid crystal region 15C is vertical to the polarization direction 13B of the corresponding images, the images may directly travel through the interface between the liquid crystal region 15C and the lenticular lens 17 without deflection. Similarly, when the liquid crystal orientation of the liquid crystal region 15D is parallel to the polarization direction 13A of the corresponding images, the images may directly travel through the interface between the liquid crystal region 15D and the lenticular lens 17 without deflection. Meanwhile, a viewer can see 2D images by naked-eye.

Figure 2D:
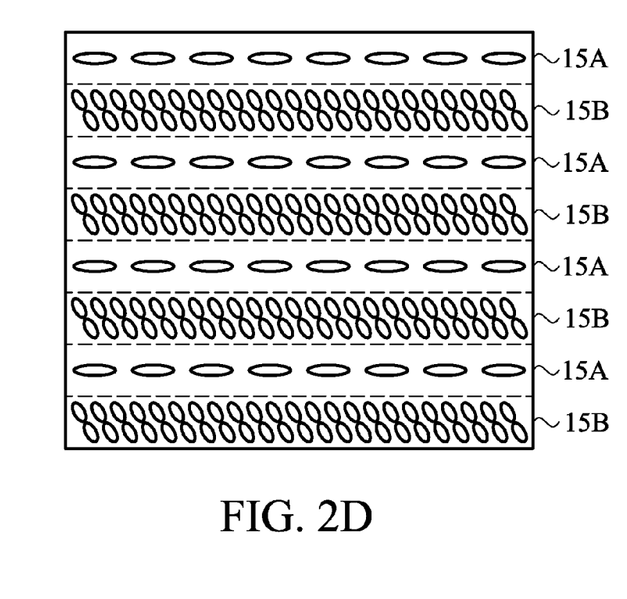
Figure 3:
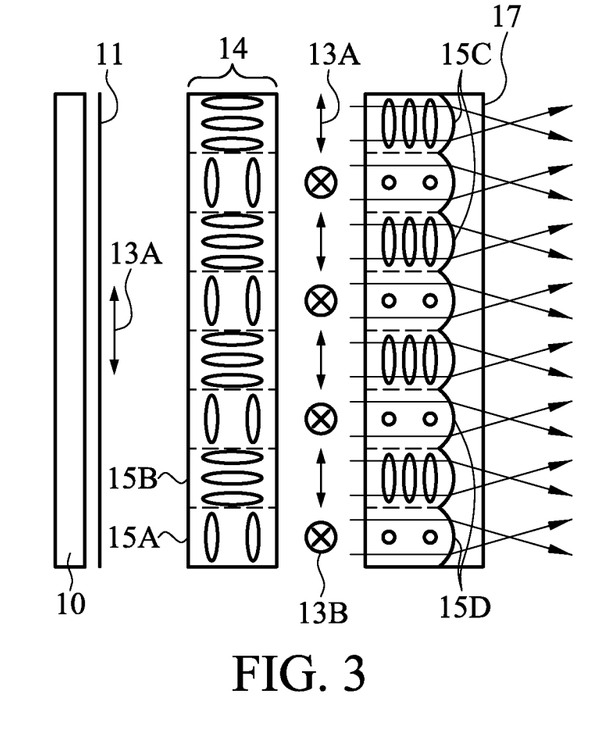
FIG. 3 shows a naked-eye type 3D image display mode of one embodiment in the disclosure.

In one embodiment, the image display apparatus of FIG. 1 may display 3D images as shown in FIG. 3. The differences between FIGS. 1 and 3 are described as follows. In FIG. 3, the liquid crystal orientation of the liquid crystal region 15A is rotated to be parallel to the incident direction of the images, and the liquid crystal orientation of the liquid region 15B is rotated to 45° and 225°, as shown in a top-view of the liquid crystal panel 14 in FIG. 2D. Similarly, the liquid crystal orientation of the liquid crystal region 15A can be vertical to the incident direction of the images and parallel to (or vertical to) the polarization direction 13A of the images, and the liquid crystal orientation of the liquid crystal region 15B can be 135° and 315°. Therefore, the images travelling through the liquid crystal region 15A will hold its polarization direction 13A, and the images travelling through the liquid crystal region 15B have a new polarization direction 13B (0° and 180°) rotated from the original polarization direction 13A. Note that the liquid crystal orientations of the liquid crystal regions 15A and 15B, depending on the polarization direction of the images and the liquid crystal orientations of the liquid crystal regions 15C and 15D, are not limited to the illustrated liquid crystal orientations in the figures.

Because the liquid crystal orientation of the liquid crystal region 15C is parallel to the polarization direction 13A of the corresponding images, the images travelling through the liquid crystal region 15C will be influenced by the extraordinary refractive index ($n_e$) of the liquid crystal region 15C. As such, the images will be deflected while traveling through the interface between the liquid crystal region 15C and the lenticular lens 17. Similarly, because the liquid crystal orientation of the liquid crystal region 15D is parallel to the polarization direction 13B of the corresponding images, the images travelling through the liquid crystal region 15D will be influenced by the extraordinary refractive index ($n_e$) of the liquid crystal region 15D. As such, the images will be deflected while traveling through the interface between the liquid crystal region 15D and the lenticular lens 17. Meanwhile, the viewer can see 3D images of low-resolution by naked-eye due to deflection.

When popularity of 2D/3D TV increases as time goes by, 2D programs and 3D advertisements (or 3D programs and 2D advertisements) will be alternately arranged. The image display apparatus of the disclosure may quickly switch to a naked-eye type 2D image display mode (e.g. FIG. 1) and naked-eye type 3D image display mode (e.g. FIG. 3), such that a viewer is free of the problem of wearing/taking off the polarized glass.

Figure 5:
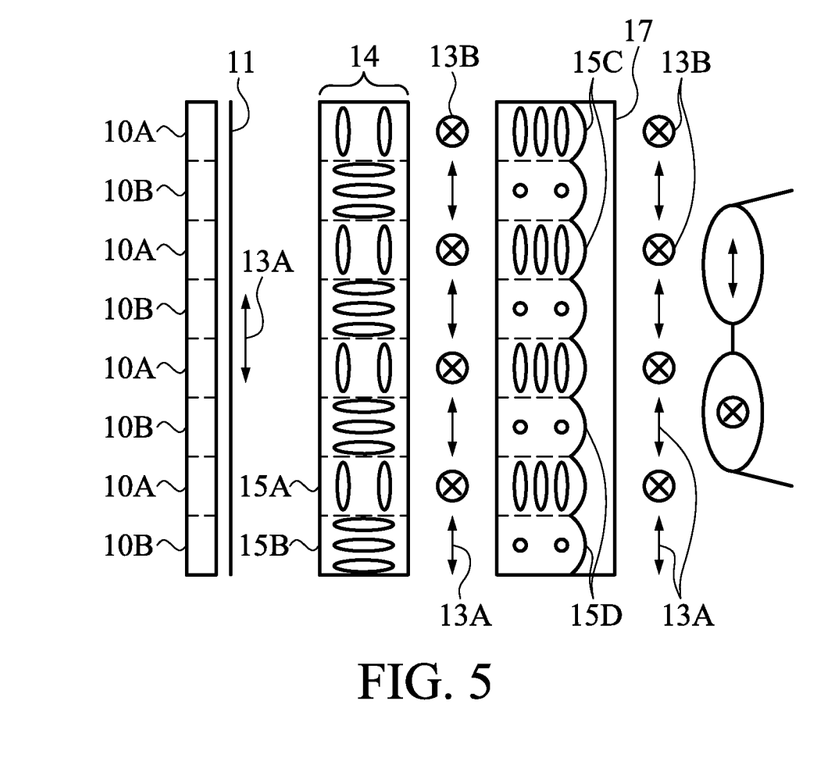
FIG. 5 shows a glass type 3D image display mode of one embodiment in the disclosure.

When a viewer want to watch 3D programs of high resolution (e.g. long period of blue-ray movies), the 2D images will not be inserted into the 3D programs. In this condition, the 3D images of high resolution can be displayed by a third display mode of the disclosure as shown in FIG. 5. The display device 10 is divided into a left eye image display region 10A (corresponding to the liquid crystal region 15A) and a right eye image display region 10B (corresponding to the liquid crystal region 15B). The polarizer 11, the liquid crystal orientations of the liquid crystal regions 15A and 15B of the liquid crystal panel 14, the liquid crystal orientations of the liquid crystal regions 15C and 15D, and the lenticular lens 17 are all similar to that in FIG. 1 and omitted here for simplicity. A viewer should wear a polarized glass composed of a right glass and a left glass. The right glass only permits images from the right eye image display region 10B (having a polarization direction 13A) to travel therethrough, and the left glass only permits images from the left eye image display region 10A (having a polarization direction 13B) to travel therethrough. Meanwhile, the viewer can see 3D images of high-resolution by wearing the polarized glass.

Accordingly, the image display apparatus of the disclosure has three image display modes: naked-eye type 2D images, naked-eye type 3D images, and glass type 3D images. The image display mode and choice of wearing the polarized glasses depend on the program type, e.g. alternately arranged 2D/3D images or long periods of 3D images and high resolution.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image display apparatus, comprising:
   a display device including a polarizer;
   a liquid crystal panel including a first liquid region of a first liquid crystal orientation and a second liquid crystal region of a second liquid crystal orientation, wherein the first liquid crystal orientation is different from the second crystal orientation; and
   a lenticular lens including a cavity to contain a third liquid crystal region of a third liquid crystal orientation and a fourth liquid crystal region of a fourth liquid crystal orientation, wherein the third liquid crystal orientation is different from the fourth crystal orientation,
   wherein the liquid crystal panel is disposed between the lenticular lens and the display device, and the first liquid crystal region corresponds to the third liquid crystal region, and the second liquid crystal region corresponds to the fourth liquid crystal region.

2. The image display apparatus as claimed in claim 1, wherein the first liquid crystal orientation is vertical to the second liquid crystal orientation, and the third liquid crystal orientation is vertical to the fourth liquid crystal orientation.

3. The image display apparatus as claimed in claim 1, wherein the third and fourth liquid crystal regions have an ordinary refractive index ($n_o$) and an extraordinary refractive index ($n_e$), wherein the $n_o$ and $n_e$ have a difference of 0.01 to 2.0.

4. The image display apparatus as claimed in claim 1, wherein the third and fourth liquid crystal regions have an ordinary refractive index ($n_o$) similar to a refractive index of the lenticular lens.

5. The image display apparatus as claimed in claim 1, wherein the third liquid crystal region and the fourth liquid crystal region includes a solidified liquid crystal composition.

6. The image display apparatus as claimed in claim 1, further comprising a control circuit on a surface of the cavity.

7. The image display apparatus as claimed in claim 6, wherein the control circuit comprises an active circuit or a passive circuit.

8. A method for displaying images, comprising:
   providing the image display apparatus as claimed in claim 1 to display images, wherein the images travelling through the polarizer have a first polarization direction; and
   driving the liquid crystal panel to modulate the first liquid crystal orientation of the first liquid crystal region and the second liquid crystal orientation of the second liquid crystal region, wherein the images travelling through the first liquid crystal region have a second polarization direction, the images travelling through the second liquid crystal region have the first polarization direction, and the first polarization direction is different from the second polarization direction,
   wherein the third liquid crystal orientation of the third liquid crystal region is vertical to the second polarization direction, and the fourth liquid crystal orientation of the fourth liquid crystal region is vertical to the first polarization direction,
   wherein the images travelling through the third and fourth liquid crystal regions and the lenticular lens enter right and left eyes of a viewer, and
   wherein the viewer sees the images of a two-dimensional mode.

9. A method for displaying images, comprising:
   providing a polarized glass to a viewer, wherein the polarized glass includes a first glass for images of a first polarization direction travelling therethrough and a second glass for images of a second polarization direction travelling therethrough,
   providing the image display apparatus as claimed in claim 1 to display images, wherein the images travelling through the polarizer have the first polarization direction; and
   driving the liquid crystal panel to modulate the first liquid crystal orientation of the first liquid crystal region and the second liquid crystal orientation of the second liquid crystal region, wherein the images travelling through the first liquid crystal region have the second polarization direction, the images travelling through the second liquid crystal region have the first polarization direction, and the first polarization direction is different from the second polarization direction,
   wherein the third liquid crystal orientation of the third liquid crystal region is vertical to the second polarization direction, and the fourth liquid crystal orientation of the fourth liquid crystal region is vertical to the first polarization direction,
   wherein the images travelling through the third liquid crystal region have the second polarization direction to further travel through the lenticular lens and the second glass, and the images travelling through the fourth liquid crystal region have the first polarization direction to further travel through the lenticular lens and the first glass, and
   wherein the viewer sees the images of a three-dimensional mode.

10. A method for displaying images, comprising:
    providing the image display apparatus as claimed in claim 1 to display images, wherein the images travelling through the polarizer have a first polarization direction; and driving the liquid crystal panel to modulate the first liquid crystal orientation of the first liquid crystal region and the second liquid crystal orientation of the second liquid crystal region, wherein the images travelling through the first liquid crystal region have a first polarization direction, the images travelling through the second liquid crystal region have the second polarization direction, and the first polarization direction is different from the second polarization direction;

wherein the third liquid crystal orientation of the third liquid crystal region is parallel to the second polarization direction, and the fourth liquid crystal orientation of the fourth liquid crystal region is parallel to the first polarization direction, wherein the images travelling through an interface between the third and fourth liquid crystal regions and the lenticular lens are deflected to right and left eyes of a viewer, and wherein the viewer sees the images of a three-dimensional mode.

* * * * *